United States Patent
Allen et al.

(10) Patent No.: US 10,049,031 B2
(45) Date of Patent: Aug. 14, 2018

(54) CORRELATION OF VIOLATING CHANGE SETS IN REGRESSION TESTING OF COMPUTER SOFTWARE

(71) Applicant: International Business Machines Corporation, Armonk, NY (US)

(72) Inventors: Corville O. Allen, Morrisville, NC (US); Albert A. Chung, Cary, NC (US); Andrew R. Freed, Cary, NC (US); Richard A. Salmon, Apex, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 14/565,110

(22) Filed: Dec. 9, 2014

(65) Prior Publication Data
US 2016/0162385 A1 Jun. 9, 2016

(51) Int. Cl.
*G06F 11/36* (2006.01)
*G06F 8/41* (2018.01)
*G06F 9/445* (2018.01)

(52) U.S. Cl.
CPC ........ *G06F 11/368* (2013.01); *G06F 11/3688* (2013.01); *G06F 8/41* (2013.01); *G06F 9/445* (2013.01); *G06F 11/3672* (2013.01); *G06F 11/3676* (2013.01)

(58) Field of Classification Search
CPC ............. G06F 11/3672; G06F 11/3676; G06F 11/368; G06F 8/41; G06F 9/445

USPC ........................................................ 717/124
See application file for complete search history.

(56) References Cited

U.S. PATENT DOCUMENTS

| 8,132,157 | B2 | 3/2012 | Dhuvur et al. |
| 2006/0036910 | A1* | 2/2006 | Fung ................. G06F 11/3672 714/25 |
| 2008/0120595 | A1* | 5/2008 | O'Farrell ................. G06F 8/41 717/106 |
| 2012/0159247 | A1 | 6/2012 | Johnson et al. |
| 2014/0013307 | A1* | 1/2014 | Hansson ............. G06F 11/3692 717/124 |

* cited by examiner

*Primary Examiner* — Wei Zhen
*Assistant Examiner* — Mohammed Huda
(74) *Attorney, Agent, or Firm* — Steven M. Greenberg, Esq.; CRGO Law

(57) ABSTRACT

Embodiments of the invention provide for the correlation of violating change sets during regression testing of a computer program. A method of the invention includes annotating a test case with a reference to logical operations of different programmatic objects of a computer program. Thereafter, change sets are applied to the program and the test case is executed by a development environment such as a debugger to a point of failure. It is then determined from the annotations change sets related to the logical operations and different ones of the determined change sets are sequentially replaced and the test case repeatedly re-executed. As such, the ones of the replaced change sets resulting in failure from re-execution of the test case are determined to be violating change sets.

20 Claims, 2 Drawing Sheets

CORRELATION OF VIOLATING CHANGE SETS IN REGRESSION TESTING OF COMPUTER SOFTWARE

BACKGROUND OF THE INVENTION

Field of the Invention

The present invention relates to software testing and more particularly to the regression testing of computer software.

Description of the Related Art

Software functional testing relates to the functional testing of a graphical user interface (GUI) coupled to an underlying software application. Conventional functional testing tools allow the end user to create, modify and run functional, distributed functional, regression and smoke tests for applications built using any of a wide variety of integrated development environments. In this regard, the conventional functional testing tool can generate a test script for a GUI in which elements of the GUI can be exercised both sequentially and conditionally. Through a thorough testing of the GUI of an application, the functional testing tool can automatically identify defects early, often and repeatably.

Operational testing, in comparison to functional testing, refers to the exercise of the logical performance of an application under test. In operational testing, the invocation of an object can be used to compare an expected outcome with an actual outcome from the invocation. Both operational and functional testing can be automated through the use of testing scripts implementing different test cases. Testing scripts can be produced manually and provided as input to a testing engine, or the testing scripts can be generated in an automated fashion.

Regression testing as a form of both functional and operational testing, refers to a type of software testing designed to identify new software coding flaws, errors, failures or faults in an existing application after a change such as enhancement, patch or configuration change has been applied thereto. The intent of regression testing is to ensure that changes to an application have not introduced new faults. Further, regression testing aims to determine whether a change in one part of the application affects another part of the application. Common regression testing methods include re-running previously completed tests and detecting different program behaviors than expected or detecting the re-emergence of previously resolved faults.

Normally during regression testing, once a failure has been detected, the failure either can be ignored or flagged as a failure. Once the failure has been flagged, however, re-execution of the regression test so as to trace the source of the failure is not possible. Instead, the software developer must recreate the testing environment, or the software developer must restart a portion of the test case validation which in turn requires the configuration of the execution environment including product installation and start-up, and the sequential execution of the parts of the test case. Thus, a host of activities may be required in order to execute the relevant test case. Plainly, this can be time consuming.

BRIEF SUMMARY OF THE INVENTION

Embodiments of the present invention address deficiencies of the art in respect to regression testing of computer software and provide a novel and non-obvious method, system and computer program product for the correlation of violating change sets during regression testing of a computer program. In an embodiment of the invention, a method of correlating violating change sets during regression testing of a computer program includes annotating a test case in memory of a computer with a reference to one or more logical operations of different programmatic objects of a computer program. Thereafter, a multiplicity of change sets of objects are applied to the computer program and the test case executed in a programming environment such as a debugger to a point of failure.

It is then determined from the annotations one or more of the change sets related to the logical operations. Then, different ones of the determined change sets of objects are sequentially replaced, for instance hot-code replaced, in the computer program and the test case is re-executed from before the point of failure until all of the determined change sets of objects have been replaced and the test case re-executed. For each re-execution of the test case resulting in a failure, a corresponding replaced change set leading to the failure of re-execution is identified as a violating change set.

In one aspect of the embodiment, the different ones of the determined change sets of objects are different combinations of the determined change sets of objects. In this regard, the combinations may be based upon a common relationship of the objects to a commonly referenced operation. Alternatively, the combinations may be based upon a common relationship of the objects to a commonly referenced property. It is to be recognized, however, that other basis for formulating combinations of the determined change sets of object are possible in respect to different annotations present in the test case. In another aspect of the embodiment, the change sets include changed source code. In yet another aspect of the embodiment, the change sets include changed properties.

In another embodiment of the invention, a regression testing data processing system is configured for the correlation of violating change sets during regression testing of a computer program. The system includes a host computing system that includes one or more computers each with memory and at least one processor. The system also includes a regression testing application executing in the memory of the computer and operable to execute test cases for a computer program. Finally, the system includes a correlation module coupled to the regression testing computer program.

The module includes program code enabled upon execution in the memory of the host computing system to annotate a test case with a reference to one or more logical operations of different programmatic objects of the computer program, to apply a multiplicity of change sets of objects to the computer program, to direct the regression testing application to execute the test case to a point of failure, to determine from the annotations one or more of the change sets related to the logical operations, to sequentially replace in the computer program different ones of the determined change sets of objects and to direct the regression testing application to re-execute the test case from before the point of failure for each replaced change set or sets until all of the determined change sets of objects have been replaced for re-execution of the test case. The program code additionally is enabled to respond to each failure of re-execution by identifying a corresponding one of the determined change sets replaced for the re-execution as a violating change set.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the correlation of violating change sets during regression testing of a computer program. In accordance with an embodiment of the invention, a test case can be annotated with one or more references to logical operations excluded from a calling stack for the test case during the execution of the test case. Also, one or more annotations can be provided within the test case each referencing a configuration property of the computer program, or the execution environment of the computer program. Finally, multiple different change sets can be mapped to the different logical operations. Thereafter, during execution in the test case, in response to a failure, relevant ones of the changes sets can be determined based upon a correlation of ones of the change sets with the annotated logical operations. Consequently, selected ones of the correlated change sets can be sequentially replaced and the test case re-executed so as to identify those of the correlated change sets permitting successful completion of the test case and one or more of the correlated change sets causing the failure.

Figure 1:
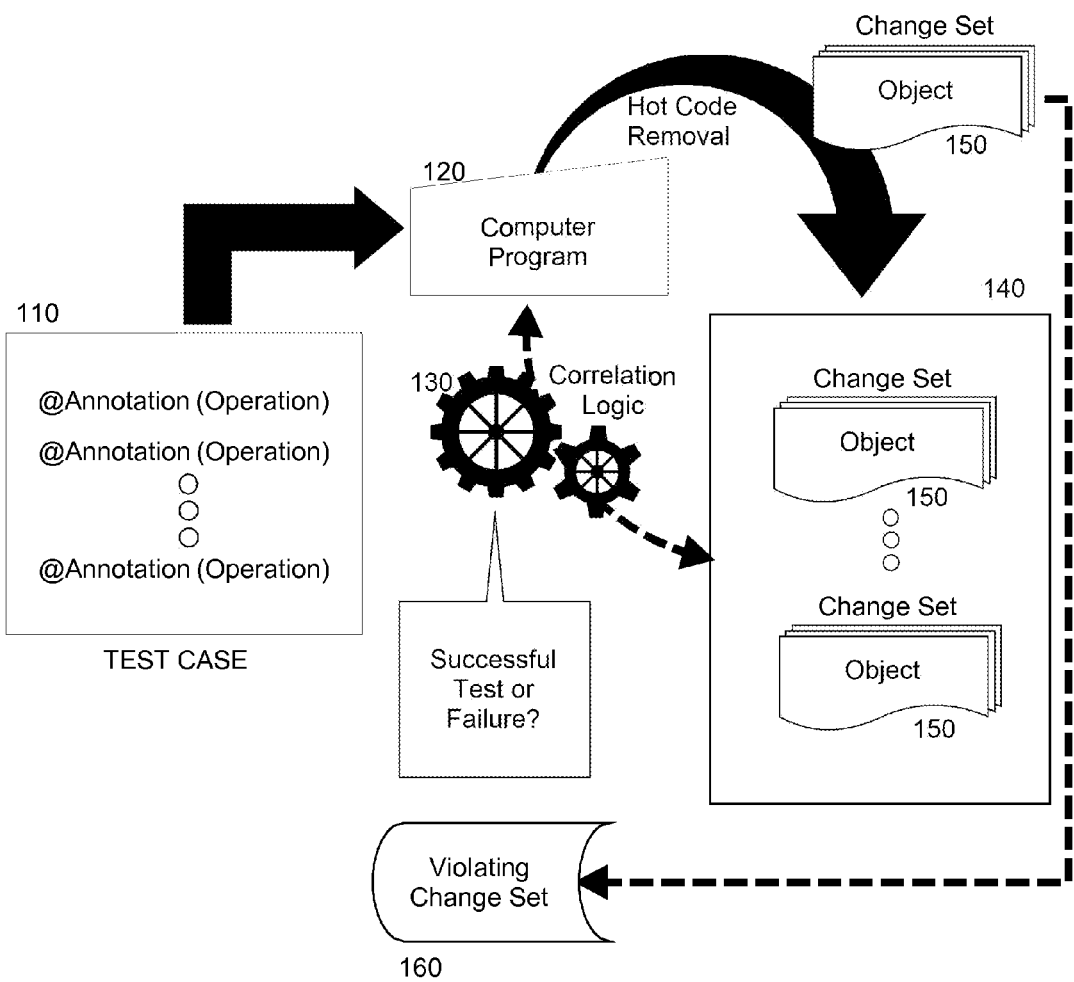
FIG. 1 is a pictorial illustration of a process for the correlation of violating change sets during regression testing of a computer program.

In further illustration, FIG. 1 pictorially shows a process for the correlation of violating change sets during regression testing of a computer program. As shown in FIG. 1, a test case 110 for a computer program 120 can be annotated to indicate operations of different methods or functions of programmatic units such as class objects of program modules or libraries that are related to the testing of the computer program 120, but not within the call stack of execution of the test case 110. Upon detecting a failure of execution of the test case 110, correlation logic 130 can determine from the annotations one or more pertinent operations and the correlation logic 130 can map the pertinent operations to a selection 140 of one or more objects of different change sets 150 applied to the computer program 120 prior to executing the test case 110.

Thereafter, the correlation logic 130 can replace, for example by way of hot code replacement, different ones of the objects of different ones of the change sets 150 and the correlation logic 130 can direct the re-execution of the test case 110. To the extent that the test case 110 fails during re-execution, the correlation logic 130 can conclude that the objects of the change sets 150 subject to hot code replacement were a violating change set 160 giving rise to the initial failure of the test case 110. In contrast, to the extent that the test case 110 does not fail during re-execution, the correlation logic 130 can conclude that the objects of the change sets 150 subject to hot code replacement were not a violating change set 160 and did not give rise to the initial failure of the test case 110.

The process can repeat iteratively for each of the change sets 150 in the selection. If none of the change sets 150 are determined to be a violating change set 160 during the process of iteratively replace each of the change sets 150, as an option the correlation logic 130 can perform replacement of different combinations of the change sets 150. Those combinations can be determined heuristically, for example according to those of the change sets 150 related by a common main function or commonly accessed source code, or according to those of the change sets 150 related by a common main function or commonly accessed source code along with a common property configuration of the computer program 120 or operating environment of the computer program 120, according to those of the change sets 150 applying changes to a property configuration of the computer program 120 or operating environment of the computer program 120, according to those of the change sets 150 associated with a particular end user, according to those of the change sets 150 related by one another by a common relationship tag, or according to those of the change sets 150 most recently applied to the computer program 120 prior to the execution of the test case 110.

Figure 2:
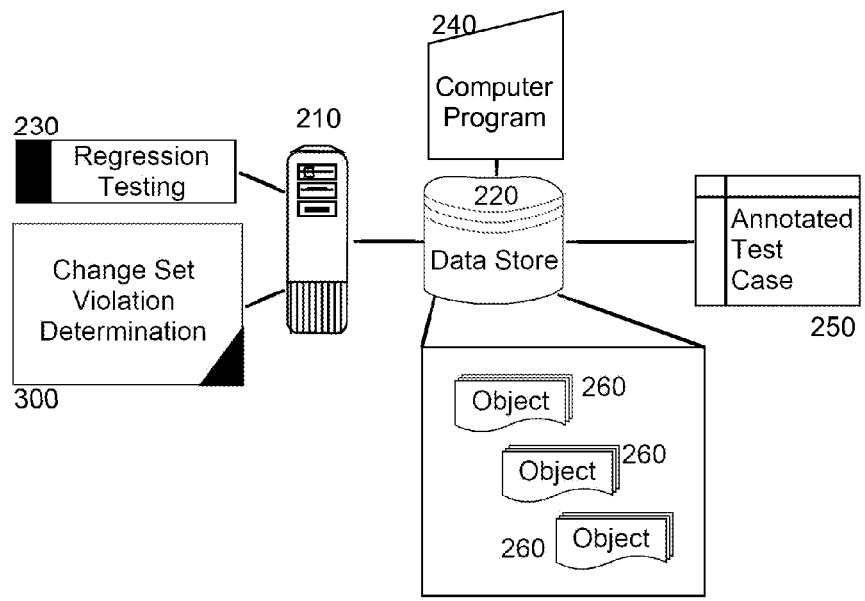
FIG. 2 is a schematic illustration of a regression testing data processing system configured for the correlation of violating change sets during regression testing of a computer program; and, FIG. 3 is a flow chart illustrating a process for the correlation of violating change sets during regression testing of a computer program.

Of note, the process described in connection with FIG. 1 can be implemented within a regression testing data processing system. In yet further illustration, FIG. 2 schematically shows a regression testing data processing system configured for the correlation of violating change sets during regression testing of a computer program. The system includes a host computing system 210 that can include one or more computers, each with memory and at least one processor. The host computing system 210 can support the operation of a regression testing application 230 configured to perform regression testing of a computer program 240 stored in data store 220 and enabled for execution in the host computing system 210.

Of note, a change set violation determination module 300 can be coupled to the regression testing application 230. The module 300 includes program code enabled upon execution in the memory of the host computing system 210 to respond to a failure of an annotated test case 250 for the computer program by mapping a selection of change sets 260 of objects applied to the computer program to annotations pertaining to operations related to a portion of the test case 250. The program code of the module 300 thereafter can hot code replace each one of the change sets 260 in the selection before directing the regression testing application 230 to re-execute the test case 250. To the extent that the re-execution of the test case 250 fails, the hot code replaced one of the change sets 260 can be determined to be the violating ones of the change sets 260.

Figure 3:
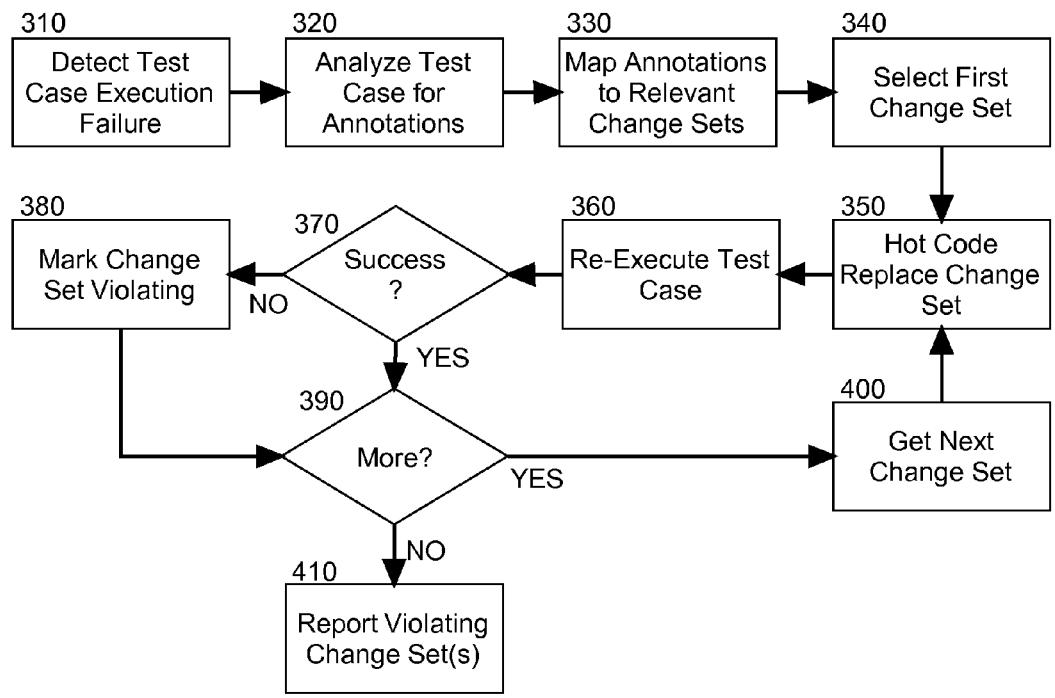

In yet further illustration of the operation of the change set violation determination module 300, FIG. 3 is a flow chart illustrating a process for the correlation of violating change sets during regression testing of a computer program. The process begins in block 310 with the detection of a test case execution failure for an annotated test case in a development environment, such as a debugger. The type of the failure can be determined to derive from an exception or an assertion. If the type of the failure is determined to have been derived from an exception, a stack trace for the execution of the test case can be walked to determine execution path class and a root cause class. Thereafter, in block 320 the configuration of the test case can be analyzed to determine other properties of the source code. For instance, the annotations of the test case can be analyzed to identified annotated user properties or system properties. Also, the annotation of the main function can be analyzed so as to identify the source and property file names. Finally, the methods of the test case can be parsed to identify each called class and methods therein to identify source code annotated as accessed.

In block 330, the analyzed annotations can be mapped to a selection of change sets effected by the source code and properties identified during analysis. Thereafter, in block 340 a first one of the change sets in the selection can be selected, for instance in accordance with an date added order and in block 350, the selected change set can be hot code replaced. Specifically, the selected change set can be pulled from the data store storing the change sets, the selected change set can be compiled and verified as having no compilation errors, and the compiled classes and methods thereafter can be pushed to the debugger for inclusion during re-execution of the text case. As such, in block 360, the test case can be re-executed.

In decision block 370, it can be determined if the re-execution of the test case succeeds or fails. If the re-execution of the test case fails, in block 380 the hot code replaced one of the change sets can be marked as a violating change set. Thereafter, in decision block 390 it can be determined if additional change sets in the selection remain to be processed. If so, in block 400 a next change set in the selection can be selected for processing. Otherwise, the process can end in block 410.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of correlating violating change sets during regression testing of a computer program comprising:
    annotating a test case in memory of a computer with a reference to one or more logical operations of different programmatic objects of a computer program each excluded from a calling stack for the test case during execution of the test case;
    applying a multiplicity of change sets of objects to the computer program;
    executing the test case in a development environment to a point of failure; and,
    on condition the execution of the test case fails:
        determining from the annotations one or more of the change sets related to the logical operations;
        hot code replacing in the development environment different ones of the determined change sets of objects in a recompiled state;
        re-executing the test case from before the point of failure;
        detecting another failure in the test case,
        hot code replacing of others of the determined change sets of the objects and repeating the re-executing, detecting and hot code replacing until the test case completes execution successfully, or until all of the determined change sets of the objects have been hot code replaced.

2. The method of claim 1, wherein the different ones of the determined change sets of objects are different combinations of the determined change sets of objects.

3. The method of claim 1, wherein the change sets include changed source code.

4. The method of claim 1, wherein the change sets include changed properties.

5. The method of claim 2, wherein the combinations are based upon a common relationship of the objects to a commonly referenced operation.

6. The method of claim 2, wherein the combinations are based upon a common relationship of the objects to a commonly referenced property.

7. The method of claim 1, wherein the different ones of the determined change sets of objects are replaced using hot-code replacement.

8. A regression testing data processing system configured for the correlation of violating change sets during regression testing of a computer program, the system comprising:
    a host computing system comprising one or more computers each with memory and at least one processor;
    a regression testing application executing in the memory of the computer and operable to execute test cases for a computer program; and,
    a correlation module coupled to the regression testing computer program, the module comprising program code enabled upon execution in the memory of the host computing system to annotate a test case with a reference to one or more logical operations of different programmatic objects of the computer program each excluded from a calling stack for the test case during execution of the test case, to apply a multiplicity of change sets of objects to the computer program, to direct the regression testing application to execute the test case to a point of failure, and, on condition the execution of the test case fails:
        to determine from the annotations one or more of the change sets related to the logical operations,
        to hot code replace in the regression testing application different ones of the determined change sets of objects in a recompiled state
        to direct the regression testing application to re-execute the test case from before the point of failure;
    to detect another failure in the test case,
        to hot code replace others of the determined change sets of the objects and to repeat the re-executing, detecting and hot code replacing until the test case completes execution successfully, or until all of the determined change sets of the objects have been hot code replaced.

9. The system of claim 8, wherein the different ones of the determined change sets of objects are different combinations of the determined change sets of objects.

10. The system of claim 8, wherein the change sets include changed source code.

11. The system of claim 8, wherein the change sets include changed properties.

12. The system of claim 9, wherein the combinations are based upon a common relationship of the objects to a commonly referenced operation.

13. The system of claim 11, wherein the combinations are based upon a common relationship of the objects to a commonly referenced property.

14. A computer program product for correlating violating change sets during regression testing of a computer program, the computer program product comprising a computer readable storage medium having program instructions embodied therewith, the program instructions executable by a device to cause the device to perform a method comprising:
   annotating a test case in memory of a computer with a reference to one or more logical operations of different programmatic objects of a computer program each excluded from a calling stack for the test case during execution of the test case;
   applying a multiplicity of change sets of objects to the computer program;
   executing the test case in a development environment to a point of failure; and,
   on condition the execution of the test case fails:
      determining from the annotations one or more of the change sets related to the logical operations;
      hot code replacing in the development environment different ones of the determined change sets of objects in a recompiled state;
      re-executing the test case from before the point of failure;
      detecting another failure in the test case,
      hot code replacing others of the determined change sets of the objects and repeating the re-executing, detecting and hot code replacing until the test case completes execution successfully, or until all of the determined change sets of the objects have been hot code replaced.

15. The computer program product of claim 14, wherein the different ones of the determined change sets of objects are different combinations of the determined change sets of objects.

16. The computer program product of claim 14, wherein the change sets include changed source code.

17. The computer program product of claim 14, wherein the change sets include changed properties.

18. The computer program product of claim 17, wherein the combinations are based upon a common relationship of the objects to a commonly referenced operation.

19. The computer program product of claim 17, wherein the combinations are based upon a common relationship of the objects to a commonly referenced property.

20. The computer program product of claim 17, wherein the different ones of the determined change sets of objects are replaced using hot-code replacement.

* * * * *